US008638193B2

(12) United States Patent
Margalef et al.

(10) Patent No.: US 8,638,193 B2
(45) Date of Patent: Jan. 28, 2014

(54) ELECTRONIC UHF RADIOFREQUENCY IDENTIFICATION FOR A CONSTRAINING ENVIRONMENT

(75) Inventors: Aurelie Margalef, Aix en Provence (FR); Sylvain Poitrat, Greasque (FR); Guy Pluvinage, Fuveau (FR)

(73) Assignee: Systemes et Technologies Identification, Greasque (FR)

( * ) Notice: Subject to any disclaimer, the term of this patent is extended or adjusted under 35 U.S.C. 154(b) by 307 days.

(21) Appl. No.: 13/083,843

(22) Filed: Apr. 11, 2011

(65) Prior Publication Data

US 2011/0248828 A1   Oct. 13, 2011

(30) Foreign Application Priority Data

Apr. 13, 2010   (FR) ...................................... 10 01540

(51) Int. Cl.
*H04Q 5/22*   (2006.01)
*G06K 19/077*   (2006.01)

(52) U.S. Cl.
USPC ...................... 340/10.1; 340/572.7; 340/572.8

(58) Field of Classification Search
USPC .................................... 340/10.1, 572.7, 572.8
See application file for complete search history.

(56) References Cited

U.S. PATENT DOCUMENTS

| 8,410,938 B2* | 4/2013 | Sakama ..................... 340/572.7 |
| 2005/0231434 A1* | 10/2005 | Azadegan et al. ............ 343/767 |
| 2007/0241908 A1 | 10/2007 | Coop |
| 2008/0074259 A1* | 3/2008 | Houston ...................... 340/556 |
| 2008/0186187 A1* | 8/2008 | Adkins et al. ............. 340/572.8 |

FOREIGN PATENT DOCUMENTS

| FR | 2928761 A1 | 9/2009 |
| GB | 2366430 A | 6/2002 |
| WO | 2010002542 A2 | 1/2010 |

OTHER PUBLICATIONS

Kwon B. Lee, Compact slotted planar inverted-F RFID tag mountable on metallic objects, Nov. 2005, XP006025622, pp. 1308-1310.*
Sung-Joo Kim, RFID Tag Antenna Moutable on Metallic Plates, Dec. 2005, XP010902385, pp. 1-3.*
French Search Report and Written Opinion; French Application Serial No. FR 1001540; dated Nov. 19, 2010.
Website http://fr.wikipedia.org/wiki/Radio-identification. Dated May 8, 2013, "Radio identification." Attached is English Machine Translation, All together 23 pages. Identified in Application as http://fr.wikipedia.org/wiki/Radio-identification.

(Continued)

*Primary Examiner* — Brian Zimmerman
*Assistant Examiner* — Bhavin M Patel
(74) *Attorney, Agent, or Firm* — Brooks Kushman P.C.

(57) ABSTRACT

The invention relates to electronic radiofrequency identification in the ultra-high frequency (UHF) range for marking an article (4) that is to be identified in a constraining environment. For this purpose, an electronic device (2) comprises: a dielectric substrate (12) having a peripheral edge face (13) and a ground face (15); an electronic chip (16); and a curved and short-circuited antenna (9) (PIFA) that presents a radiating area defined by at least two dipoles (19, 20). The antenna (9) on a transmission surface (14) of the substrate (12) is connected by a short-circuiting element (17) presenting a short-circuiting area presenting an area in projection on the edge face (13) that is of the order of 3% to 5% of the radiating area of the curved antenna (PIFA).

20 Claims, 3 Drawing Sheets

(56) References Cited

OTHER PUBLICATIONS

Website http://fr.wikipedia.org/wiki/Radio-identification. Dated Dec. 11, 2008, "Radio-identification." Attached is English Machine Translation, All together 14 Pages. Identified in Application as http://fr.wikipedia.org/wiki/Radio-identification.

Website RTCA Paper No. 083-10/PMC-794, Dated Mar. 17, 2010, 2 Pages, "Terms of Reference Special Committee 209" Identified in Application as EUROCEAED14E(D0160E)Section_8:cf. http://www.rtca.org/downloands/ListofAvailable%20Docs March2010.htm).

Website http://www.hyper-rf.com/Hyperfrequences/Antennes/Antennes-VIIPIFA.html, Dated Jul. 4, 2010, English Machine Translation attached to orginal, All together 4 Pages. "Antennas in our daily life, VII. The PIFA antennas."; "Antennes dans notre vie quotidienne." Identified in Application as http://www.hyper rf.com/Hyperfrequences/Antennes/Antennes VII_PIFA.html.

Son et al. Orginally in Electronics and Telecommunications Research Institute Journal, Received Aug. 8, 2006, Microwave and Optical Technology Letters Mar. 2007, vol. 49, No. 3, p. 715-717, "Orthogonally Proximity—Coupled Patch Antenna for a Passive RFID Tag on Metallic Surfaces".

Park et al. Antennas and Propagation Society International Symposium, 2007 IEEE, p. 2285-2288, "Various UHF RFID Tag for Metallic Object." Identidied in Application as "Various UHF RFID tags for metallic object" (Yong Kwon Park et al.; Daegu University; published on-line on the site http://www.ieee.org under IEEE1 4244 0878 4/07-2007; pp. 2286-2288).

Kim et al. Microwave Conference 2008. APMC 2008. Asia-Pacific, pp. 1-4, "Ceramic patch antenna using inductive coupled feed for UHF RFID tag mountable on metallic objects."

Choi et al. Electron. & Telecommun. Res. Inst. (ETRI), Antennas and Propagation Society International Symposium, 2008. AP-S 2008. IEEE, pp. 1-4, "A small RFID tag antenna to identify metallic objects." Identified in Application as "Small RFID tag antenna to identify metallic objects" (Wonkyu Choi et al.; ETRI; published on-line on the site http://www.ieee.org under IEEE978 1 4244 2042 3/08-2008).

Website http://www.ansys.com/Products/Simulation+Technology/Electromagnetics/High-Performance . . . , Dated Jun. 21, 2013, 1 Page. "ANSYS HFSS" Identified in Application as http://www.ansoft.com/prducts/hf/hfss/ (1 Page).

Website Retrieved on Jun. 21, 2013, English Machine Translation attached to original, All together 7 Pages, Telecommunication Equation:, "Equation des Telecommunications.", http://fr.wikipedia.org/wiki/%C3%89quation_des_t%C3%A91%C3%A9communications Identified in Application as http://fr.wikipedia.org/wiki/%C3%89quation_des_t%C3%A91%C3%A9communications.

* cited by examiner

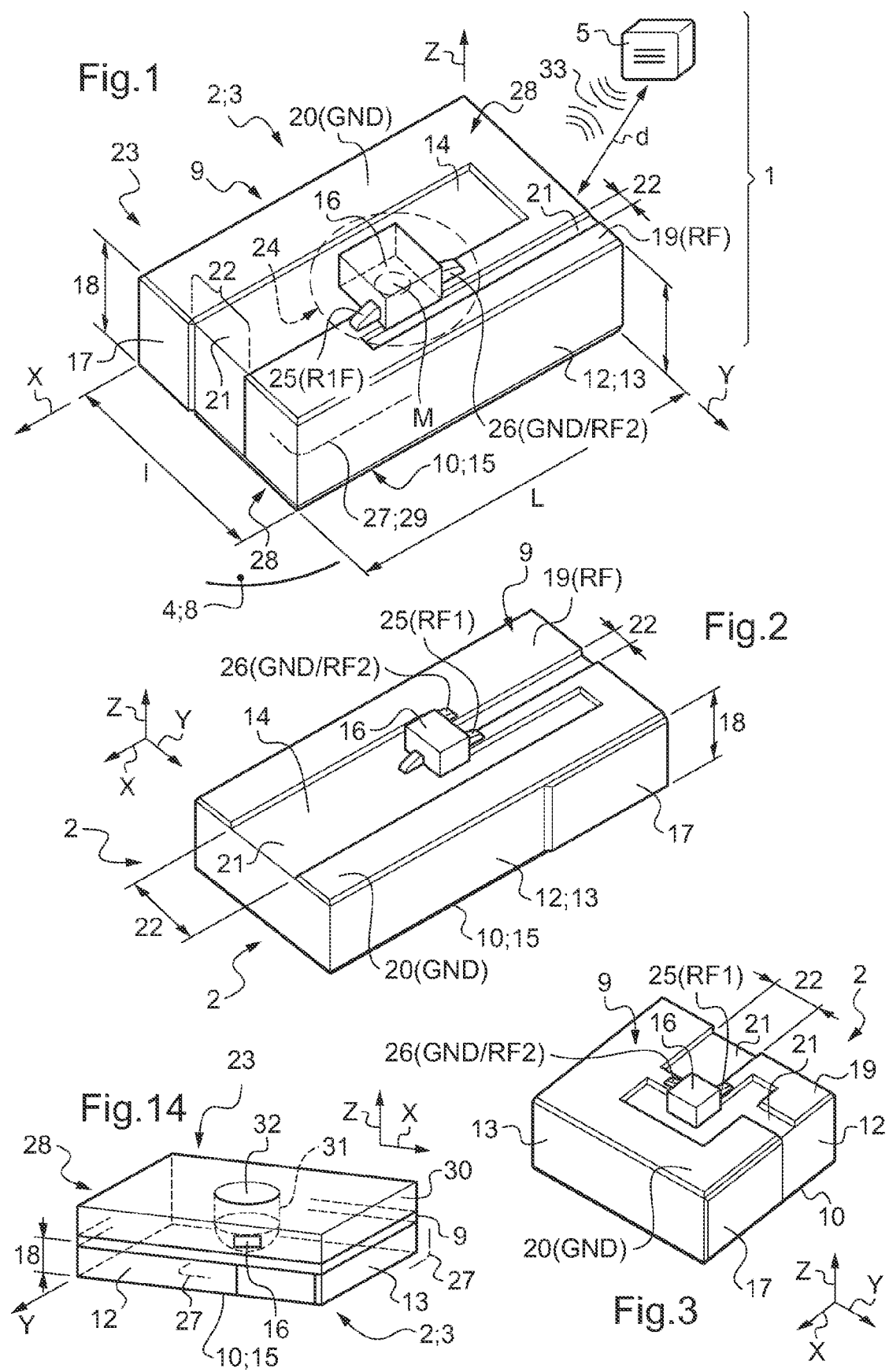

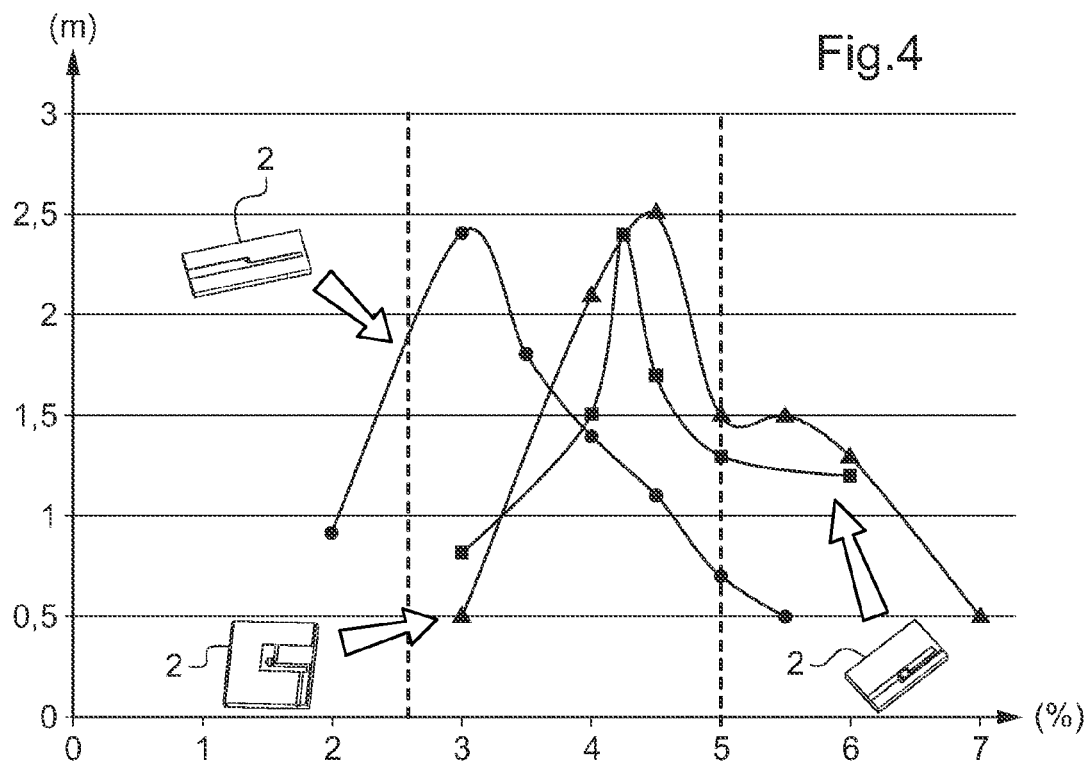
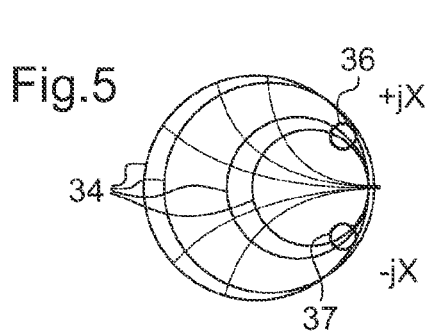
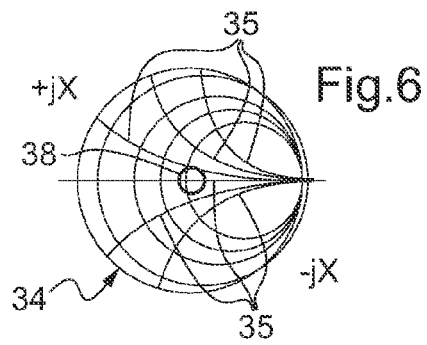
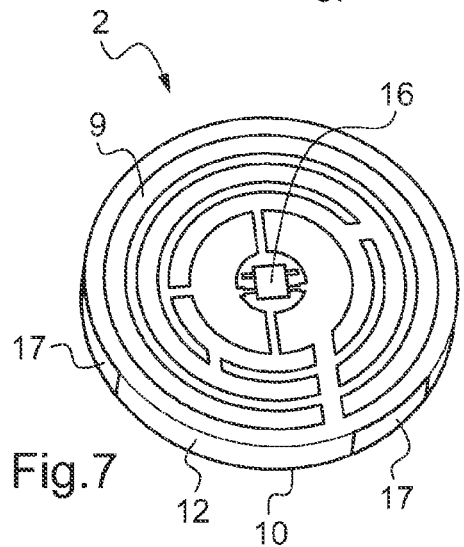
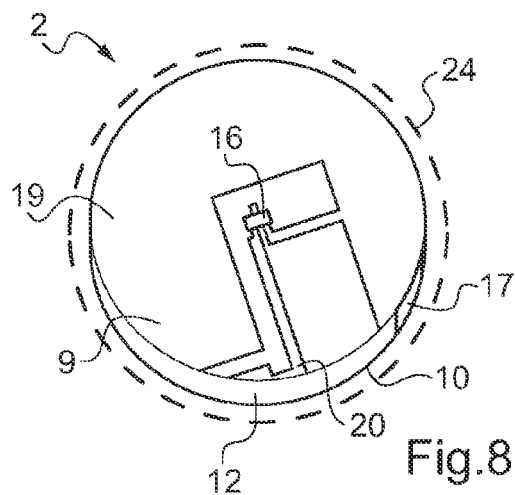

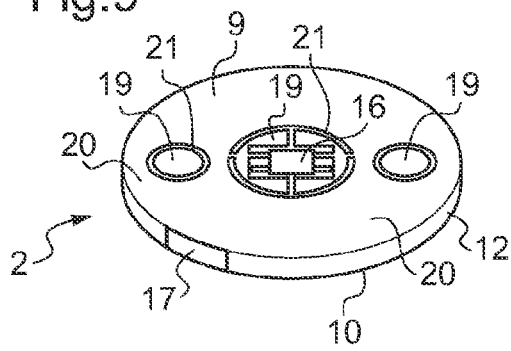
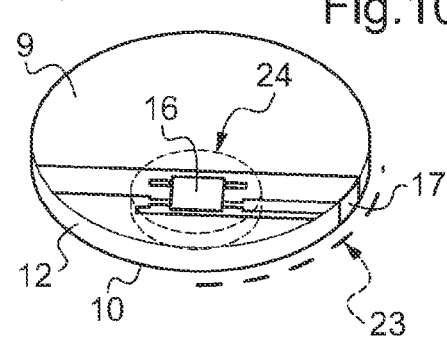
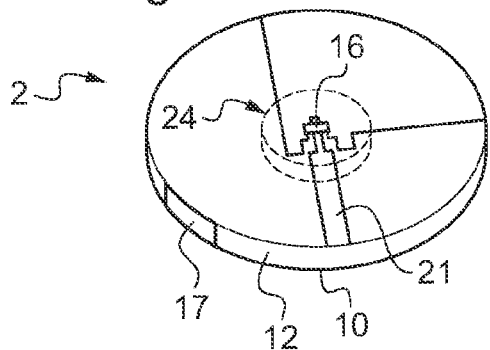
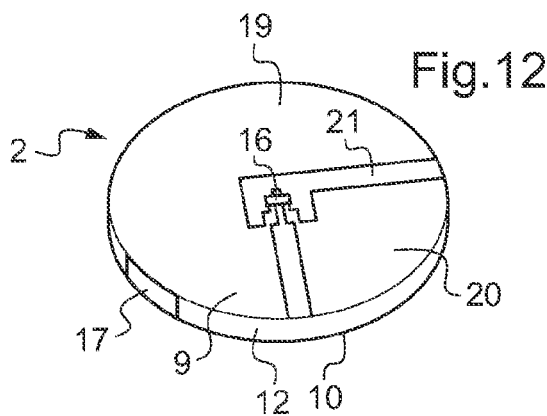
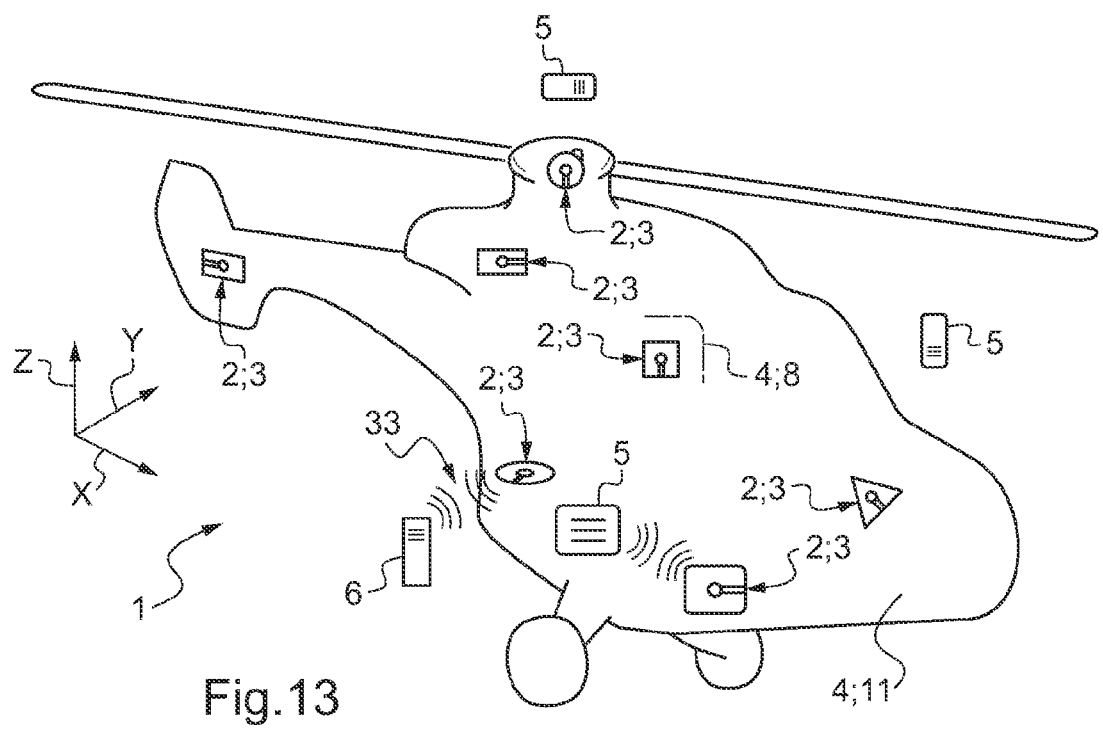

ELECTRONIC UHF RADIOFREQUENCY IDENTIFICATION FOR A CONSTRAINING ENVIRONMENT

CROSS REFERENCE TO RELATED APPLICATIONS

This application claims the benefit of FR 10 01540 filed on Apr. 13, 2010, the disclosure of which is incorporated in its entirety by reference herein.

BACKGROUND OF THE INVENTION (1) Field of the Invention

The invention relates to electronic radiofrequency identification (RFID).

(2) Description of Related Art

For several tens of years, traceability data has been physically coupled to a component, e.g. in the form of an electronic tag that is itself physically attached to an article that is included in or that constitutes said component. The article or the component is said to be marked.

Applications are widespread and varied, from logistics to anti-theft marking, and including operational tracking of such articles or components.

One of the practical aspects of RFID identification is remotely writing/reading traceability data (or marking information) between a reader and the electronic tag. The term "contactless" is used as in "contactless" reading/writing, and "contactless" electronic device for structures such as the electronic tag.

At present, RFID identification faces two difficult technical problems when contactless reading/writing is to take place in a constraining environment.

The term "constraining" is used of an environment to cover two situations that may both occur simultaneously in certain applications.

For one of these two situations that define a constraining environment, reference may be made to the Wikipedia website using the search phrase "radio-identification". It can be understood from that document that contactless reading/writing is "more difficult" for articles that are situated in a metal container. The potential communication distance is diminished by the Faraday cage effect, which performs electromagnetic shielding.

More generally, a constraining environment is an environment that forms undesirable electromagnetic shielding that serves to make contactless reading/writing difficult (i.e. possible at a short range close to making contact), or even impossible.

It is therefore conventional to seek to improve contactless reading/writing when the electronic RFID device is on a metal container. However there is no technical approach that is applicable in practice to certain specific circumstances when various environmental factors form such unwanted electromagnetic shielding.

In particular, in the proximity of contactless reading/writing spaces, these environmental factors forming electromagnetic shielding may comprise: metal and/or composite structures (on, in, and around the article or component to be marked); and the presence of interfering electromagnetic fields, e.g. due to the operation of computers, radars, and other electronic appliances.

Furthermore, the other technical problem of a constraining environment relates to so-called "extreme" operating factors of the external environment.

In particular, in the proximity of contactless reading/writing spaces, such extreme environmental operating factors comprise: temperatures that are high or low, e.g. of the order of $-60°$ C./$-30°$ C. to $+150°$ C./$+200°$ C.; high levels of humidity (lying in the range 0 to 100% relative humidity in air); and atmospheric pressure conditions (of the order of 500 hexapascals (HPa) to 10,130 HPa).

There are still other environmental factors that have a negative effect on contactless reading/writing: in particular factors that, over a longer or shorter length of time, are likely to give rise to deterioration of electronic devices or identification tags involved in such reading.

In examples of avionic identification systems in a constraining environment, a system needs to remain intact and functional under:

high temperature transitions (e.g. $>95°$ C. per 20 minutes; and/or impacts $>15$ grams per 20 milliseconds; and/or vibration in the range 19.20 hertz (Hz)$<$NM$\times$FM$<$28.70 Hz, according to document EUROCEA-ED14E-(DO160E)-Section_8: cf. the Radio Technical Commission for Aeronautics (RTCA) website.

It can be understood that when a plurality of these environmental factors are combined, contactless reading/writing and continued operation thereof are, at present, difficult if not impossible to maintain. This is problematic, in particular when contactless reading/writing needs to be guaranteed, in particular for safety reasons.

In order to illustrate how an environment can be constraining, the invention is described in its application to the field of managing the configuration of an aircraft for maintenance and logistics purposes in aviation, without the applications of the invention being limited to this particular example.

In this respect, mention is made of document FR 2 928 761 which describes the highly constraining environment within a helicopter in which tags need to communicate. The aircraft possesses structures that are intrinsic generators of radiofrequency interference, in particular because of its metal components, its fluid tanks, its connectors, and its on-board electronic equipment. On similar lines, the ambient operating conditions of electronic tags coupled with components of the aircraft are extremely aggressive, even though the lifetime of the components may be as much as 20 years or 6000 hours of operation, for example.

Furthermore, the standards and regulations in an aviation context are particularly strict, and the above-mentioned traceability systems must satisfy those requirements scrupulously.

Other documents may be mentioned that also distinguish the present invention. Thus, document "Antennas in our daily life, VII. The PIFA antennas." (Aceli, 2004) describes a portable terminal with a plane and short-circuited curved antenna known as a planar inverted-F antenna (PIFA). A transmission face is connected to the electronics of the terminal, and a short-circuiting element is connected to a conductive grounding plane. Its performance can be improved by adding suitably placed fillers.

Document WO 2010/002542 describes an RFID device with a looped conductive antenna shield for near-field communication in the high frequency (HF) range. An electronic component is made to operate by using magnetic activity as opposed to electromagnetic activity as with UHF.

On the same lines, document "Orthogonally proximity-coupled patch antenna for passive RFID tag on metallic surfaces" (Hae-Won Son and Gil-Young Choi; ETRI; published on-line at the Interscience Wiley site under DOI10.1002/mop22222 on Aug. 8, 2006) describes several principles for tuning a chip with an antenna. An internal short-circuiting stud referred to as a "via" is placed inside a substrate perpendicular to its resonant length.

Document "Various UHF RFID tags for metallic object" (Yong-Kwon Park et al.; Daegu University; published on-line on the IEEE site under IEEE1-4244-0878-4/07—2007; pp. 2286-2288) describes passive tags having an antenna short-circuited by vias in the power supply line leading to the ground plane, and designed to be attached to a metallic article. A space is preferably provided between the antenna and the metallic article.

Document "Ceramic patch antenna using inductive coupled feed UHF RFID tag mountable on metallic objects" (Jeong-Seok Kim, et al. ILT-RFID Research Team; published on-line on the IEEE site under IEEE1-4244-2642-3/08—2008) describes UHF tags presenting a size of 25 millimeters (mm)×25 mm×3 mm and a short-circuiting plate on the edge face.

The document "Small RFID tag antenna to identify metallic objects" (Wonkyu Choi et al.; ETRI; published on-line on the IEEE site under IEEE978 1-4244-2042-3/08—2008) describes tags with two short-circuiting plates at corners of a ceramic substrate edge face perpendicular to a resonant direction.

Document GB 2 366 430 describes coupling an electronic RFID tag to a vehicle part in order to identify it and to deduce therefrom a technical procedure (specifically recycling) that is to be applied to the part after disassembly, as opposed to when it is incorporated in the vehicle.

Document US 2007/0241908 describes managing data relating to maintenance of an aircraft using electronic tags that are associated with components of the aircraft.

The transactions involved here generally take place in frequency bands lying in the range 100 megahertz (MHz) to 10 gigahertz (GHz), i.e. in the ultra-high frequency (UHF) range and the super-high frequency range (SHF).

At present, standards specify RFID interfaces in the field of marking articles as a function of the radiofrequency (RF) range used. Thus, the standard ISO18000-6 defines UHF communications parameters for an air interface in the range 860 MHz to 960 MHz. According to ETSI EN 302 208-1 V1.3.1 the radiofrequency regulations of that standard for the European geographical area specify a predefined maximum transmission power of 2 watts (W) effective radiated power (ERP). In the USA, it is the standard of the Federal Communications Commission, Title 47, Telecommunication, Chapter 1, Part 15-4-05-05 that is applicable, using a frequency in the range 902 MHz to 928 MHz, and according to Section 15.247 using a predefined maximum transmission power of 4 W effective isotropic radiated power (EIRP).

In practice, identification by means of (RFID/UHF) contactless reading/writing raises specific difficulties to which the above-mentioned documents do not provide a satisfactory solution.

Thus, present RFID identification techniques can give rise to safety problems. This applies for example if a damaged or read-silent tag leads to the maintenance or the replacement of a marked component or article to be avoided or performed late when it requires maintenance. The consequences can be catastrophic, since, in the event of such components/articles being critical elements, they have a bearing on the ability of an aircraft to fly.

Certain electronic tags have a range that is very short in a constraining environment (e.g. less than 100 mm to one meter). Consequently, the RF signals that are transmitted by such tags are sometimes not picked up (or are picked up incorrectly), thereby constituting a risk.

For example, with RFID reading/writing in an isolated theater of action with emergency action being taken while on campaign on a marked aircraft, a system of long-range on-board tags (typically active tags) goes against the safety constraints to which such an aircraft is subjected.

The weight of the traceability electronic systems including the tags coupled to the components in an aircraft are very penalizing, possibly preventing them being used.

Furthermore, the specific environment with which such tags need to communicate is very constraining, since an aircraft possesses structures that intrinsically generate radiofrequency interference, in particular because of its metal components, its fluid tanks, its connectors, and its on-board electronic equipment.

On the same lines, the ambient conditions in which the electronic tags coupled to components of the aircraft operate are extremely aggressive. Consequently, the lifetime of tags, in particular of active tags, runs the risk of not corresponding to the lifetime of the corresponding components that may be as much as 20 years or 6000 hours of operation, for example.

Furthermore, the standards and regulations in an aviation context are particularly strict, and the above-mentioned traceability systems need to comply with those recommendations scrupulously.

From the above, it can be understood firstly that increasing the range of on-board tags is not easy to achieve in practice.

Secondly, the use of tags that are lightweight and simple gives rise to reading problems (reliability, distances, etc.), to such an extent that at present it is not possible to envisage such tags being provided that do not have complex processors.

SUMMARY OF THE INVENTION

To this end, an object of the invention is to provide an electronic radiofrequency identification device in the ultra-high frequency (UHF) range. The device is for marking an article that is to be identified in an environment that is constraining.

The electronic device comprises at least:

a dielectric substrate with a peripheral edge face that defines firstly a transmission face and secondly a ground face;

an electronic chip possessing a user memory, having a predetermined impedance, and attached to said dielectric substrate;

a plane and short-circuited curved antenna (PIFA) extending over said transmission face and connected firstly to the electronic chip and to a grounding conductor plane via at least one short-circuiting element, which ground plane extends over the ground face of the substrate.

To form an identification system, such an electronic identification device is suitable for communicating by (UHF) radiofrequency waves with at least one RF reader having a predefined maximum transmission power.

In an embodiment, said substrate is made of epoxy and presents a thickness of at least 3 mm in its peripheral edge face extending perpendicularly to the transmission and ground faces; the curved antenna (PIFA) defining, on said transmission face, at least two dipole strands separated from each other by a separator slot extending substantially from the electronic chip to the proximity of the peripheral edge face (i.e. a surrounding surface between the transmission face and ground face); these two strands defining a radiating area of said curved antenna; said short-circuiting element extending over said peripheral edge face and presenting a short-circuiting area in projection on the peripheral edge face that is of the order of 3% to 5% of the radiating area of the curved antenna (PIFA).

In an embodiment, the electronic device is such that the short-circuiting element presents a short-circuiting area presenting an area in projection on the peripheral edge face that is of the order of 3.5% to 4.5% of the radiating area of the curved antenna (PIFA).

For example, each short-circuiting element is in the form of a solid outer plate or strip of electrically conductive material secured to the peripheral edge face by adhesive or the like. In certain embodiments, at least one short-circuiting element is a fitting of electrically-conductive material on the edge face, e.g. applied by printing, spraying, or painting.

In an embodiment, the epoxy substrate presents a thickness of its peripheral edge face that is of the order of 3 mm to 6 mm, e.g. of the order of 3.2 mm or 5.4 mm, or 6.2 mm, or 7.00 mm, or 7.8 mm, or even more.

In an embodiment, said short-circuiting element extends against said peripheral edge face at a distance from at least one outlet zone of said separator slot.

In an embodiment, the peripheral edge face of the dielectric substrate defines transmission and ground faces that are substantially rectangular, said short-circuiting element extending at a distance from an outlet zone of the separator slot and in a sector of said edge face that is substantially parallel to said outlet zone.

In an embodiment, the peripheral edge face of the dielectric substrate defines transmission and ground faces that are substantially rectangular, said short-circuiting element extending at a distance from an outlet zone of the separator slot and in a sector of said edge face that is substantially perpendicular to said outlet zone.

In an embodiment, the peripheral edge face of the dielectric substrate is in the proximity of or indeed is connected to and/or is on a corner of the peripheral edge face of the dielectric substrate.

In an embodiment, the peripheral edge face of the dielectric substrate defines transmission and ground faces that are substantially rounded in shape, e.g. being approximately surfaces of revolution or oval.

In an embodiment, the electronic chip possesses at least a connection terminal for connection to a first radiofrequency signal, and a connection terminal for connection to ground or to a second radiofrequency signal (respectively for a chip in asymmetrical or symmetrical mode); a dipole strand of the curved antenna is electrically coupled by the short-circuiting element to the ground plane; and said connection terminal for the first radiofrequency signal of the electronic chip is connected to the "ground" strand, that is coupled via the short-circuiting element to the ground plane.

In an embodiment, the electronic chip possesses at least a connection terminal for connection to a first radiofrequency signal, and a connection terminal for connection to ground or to a second radiofrequency signal (respectively for a chip in asymmetrical or symmetrical mode); a dipole strand of the curved antenna is electrically coupled by the short-circuiting element to the ground plane; and said connection terminal for connection to ground or to the second radiofrequency signal of the electronic chip is connected to the "ground" strand that is coupled via the short-circuiting element to the ground plane.

In an embodiment, the transmission and ground faces present respective areas of less than 1500 square millimeters ($mm^2$), in particular lying in the range 600 $mm^2$ to 1200 $mm^2$.

In an embodiment, the dipole strands of the curved antenna (PIFA), and the transmission face of the substrate presents a ratio of their respective areas of the order of 0.6 to 0.9, e.g. approximately 0.85.

In an embodiment, the two dipole strands of the curved antenna (PIFA) are arranged on the transmission face on either side of the electronic chip, e.g. said electronic chip is at least partially astride in register with an outlet zone of at least one separator slot and/or is in register with at least one separator slot perpendicularly to the transmission face.

In an embodiment, said predefined maximum transmission power is of the order of 2 W ERP or 4 W EIRP.

The invention also provides an electronic radiofrequency identification tag in the ultra-high frequency (UHF).

The tag is for marking an article that is to be identified in a constraining environment.

According to the invention, the tag includes at least one device as mentioned above together with protective packaging that covers at least said electronic chip.

The packaging possesses one or more materials having no metallic filler, such as resin and/or silicone and/or epoxy and/or fiber material having a cellulose component and/or a carbon component (aramid, glass fiber, or the like).

In an embodiment, said packaging includes means for anchoring the tag on an article to be identified.

In an embodiment, said packaging is constituted essentially by at least one cap fitted to the transmission face of the substrate in such a manner as to protect the electronic chip.

For example the tag includes a fitted cap in the form of a filler-free pellet stuck at least to the transmission face and/or the peripheral edge face and/or the ground face of the substrate and presenting at least one non-masked zone free from any packaging.

In an embodiment, said packaging of the tag is formed at least in part of a varnish that covers at least the electronic chip.

For example a filler-free varnish that is sprayed or applied by dipping, protecting a fitted cap in the form of a pellet stuck in register with the electronic chip, together with at least the transmission face, or the peripheral edge face, and possibly the ground face of the substrate.

In an embodiment, said packaging of the tag is formed at least in part from a cover plate that covers at least part of the face of the substrate in which the electronic chip is visible.

For example a cover plate made of a material that is similar to that of the substrate, that is applied by filler-free adhesive, and that possesses a concave housing facing the dielectric substrate in register with the electronic chip, said concave housing optionally forming a well that opens to the outside of said packaging through the cover plate.

For example, said open well is closed within the tag, at least in part, by an application of a stopper of filling-free resin.

In an embodiment, said protective packaging includes a non-masked zone having no packaging and in the form of a base opening in register with said ground plane.

For example said base opening receives fastener means in the form of two-sided adhesive for bonding the electronic tag to the article that is to be identified. More generally, the fastener means are secured to the substrate and/or to the packaging.

In an embodiment, said protective packaging is made at least in part out of high temperature synthetic material, e.g. flame-retardant material, such as resin and/or silicone and/or epoxy and/or carbon fiber material (aramid, glass fiber, or the like).

The invention also provides an electronic radiofrequency identification system in the ultra-high frequency range (UHF).

The system comprises at least one device and/or tag as mentioned above, on at least one article that is to be identified, together with at least one RF reader having a predefined maximum transmission power of the order of 2 W ERP or 4 W EIRP.

For example, at least one identification device communicating by RF waves with at least one RF reader at a distance of the order of 0.5 meters (m) to 3.5 m.

In an embodiment, the electronic identification system is such that at least one article that is to be identified and that has one or more electronic radiofrequency identification devices and/or electronic identification tags attached thereto includes in the proximity of said ground plane at least one area increase region.

For example, being made of metal and/or composite material; said area increase region co-operates from an electronic point of view with the curved antenna via the ground plane.

In an embodiment, at least one article that is to be identified forms part of a vehicle, e.g. an aircraft, in particular a rotary wing aircraft.

The invention also provides such an article or component, e.g. for an aircraft, that includes at least one device and/or tag as mentioned above.

BRIEF DESCRIPTION OF THE DRAWINGS

However other features and advantages of the invention appear from the following detailed description, which refers to the accompanying drawings.

In the drawings:

FIG. 1 is a diagrammatic perspective view of an embodiment in accordance with the invention of an electronic tag having a substantially rectangular outline with small main area (transmission and ground faces), with minimal packaging in the form of a synthetic cap and fastener means that are separated by large zones that are not masked; a short-circuiting element being situated in a transverse elevation plane at a corner of said device;

FIG. 2 is a view similar to FIG. 1 showing an embodiment of an identification device of elongate and substantially rectangular outline shown in a state without its packaging; a short-circuiting element being situated in a longitudinal elevation plane at a corner of said device;

FIG. 3 is a view similar to FIGS. 1 and 2 showing an embodiment in accordance with the invention of an identification device of substantially square outline, shown in a state without its packaging; a short-circuiting element being situated in a longitudinal elevation plane at a corner of said device;

FIG. 4 is a performance comparison graph having contactless read/write distance values plotted up the ordinate (in meters: m), and area ratio values plotted along the abscissa (in percentage: %), for each short-circuiting area of the elements for short-circuiting the curved antenna (PIFA) of embodiments in accordance with the invention of identification devices comparable to those shown respectively in FIG. 1 (line with square marks), of FIG. 2 (line with round marks), and of FIG. 3 (line with triangular marks);

FIGS. 5 and 6 are two diagrammatic views respectively showing the real impedance and the imaginary portions of the impedance superposed during computer-assisted design of curved antennas (PIFA) for identification devices in accordance with the invention, with FIG. 5 showing two impedance zones for targeting during design in order to ensure suitable matching (at the top) and an impedance zone for an electronic chip selected for said device, with a port corresponding to the impedance of the chip defined by the target zone;

FIGS. 7 and 8 are views similar to FIGS. 1 to 3 showing two embodiments in accordance with the invention of identification devices of substantially circular outline, with FIG. 7 showing a curved antenna (PIFA) in a labyrinth configuration and FIG. 8 showing a curved antenna with parallelogram-shaped slots;

FIG. 9 is a view similar to FIGS. 7 and 8 showing an embodiment in accordance with the invention, comprising an identification device of substantially oval outline, the curved antenna having sector-shaped slots;

FIGS. 10 through 12 are other views similar to FIGS. 7 and 8 showing three embodiments in accordance with the invention, comprising identification devices of substantially circular outline, with, respectively, FIG. 10 showing a curved antenna (PIFA) having transverse slots, FIG. 11 showing an antenna with sector-shaped slots, and FIG. 12 showing a curved antenna with angled slots; packaging made of varnish covering the cap also being shown diagrammatically;

FIG. 13 is a diagrammatic perspective view of an identification system in accordance with the invention, the system having a series of articles and/or components on board an aircraft, and a series of contactless RFID readers arranged (externally and/or on board) within the range of the on-board articles and/or components for performing a contactless read/write operation in accordance with the invention; and FIG. 14 is a diagrammatic perspective view of an embodiment in accordance with the invention, comprising an electronic tag of substantially rectangular outline with packaging that is formed in part by a cover plate that covers the face of the substrate on which the electronic chip is placed, said cover plate possessing a concave recess facing the dielectric substrate in register with the electronic chip, which concave recess forms a well that opens to the outside of said packaging through the cover plate; said well being closed by an applied stopper or filler adding.

DETAILED DESCRIPTION OF THE PREFERRED EMBODIMENT

Some of the figures show reference axes X, Y, and Z. These three axes define a rectangular XYZ frame of reference with the various constituents of the invention being described relative thereto in their context.

The X axis is arbitrarily said to be "longitudinal", in particular for those constituents of the invention that are elongate in shape having a long side arranged to coincide with the longitudinal X axis. The Y axis is arbitrarily said to be transverse, and constituents of elongate shape have their short sides perpendicular to the longitudinal X axis have a short side shown as coinciding with said transverse Y axis. Finally, the Z axis is arbitrarily referred to as the elevation axis since the thickness of the constituents perpendicular to the X and Y axes is shown as extending along the elevation Z axis.

In FIGS. 1 and 13, numerical reference 1 designates an electronic radiofrequency identification system (RFID) operating in the ultra-high frequency (UHF) range.

Each electronic RFID identification system 1 comprises at least one identification device 2 and/or an identification tag 3. These devices 2 and/or tags 3 are also referred to as "labels" or "transponders". In general, the system 1 possesses a plurality of devices 2, each incorporated in a respective identification tag 3. Each device 2 or tag 3 is coupled to an article 4 (or to a component of the article, likewise referenced 4).

Furthermore, an electronic RFID identification system 1 includes at least one radiofrequency (RF) reader 5. In FIG. 1, the system 1 has a single reader 5, whereas in FIG. 13, the system 1 has a plurality of readers. It should be observed that the electronic system 1 may also include at least one reader 6 of the portable reader type.

Depending on whether they are for use on European or American territory, the readers 5 of a system have a predefined maximum transmission power respectively of the order of 2 WERP or 4 WEIRP.

By means of the invention, in a system 1, an identification device 1 communicates by RF waves with at least one RF reader 5 at a distance d of the order of 0.3 m to 3.5 m.

Paradoxically, it should be observed that the invention can take advantage of the system 1 being in a constraining environment. The electronic identification system 1 is such that at least one article 4 for identifying having one or more electronic identification device(s) 2 and/or electronic identification tag(s) 3 attached thereto includes in the proximity of at least certain ground planes at least one area increase region (reference 8 in FIGS. 1 and 13).

In the example of FIG. 13, said area increase region 8 is sometimes made of metal and/or of composite material. Surprisingly, this area increase region 8 co-operates from an electromagnetic point of view with a curved antenna 9 (of the PIFA type) via a ground plane 10 of each device 2.

In the embodiment of FIG. 13, each article 4 for identifying forms part of a vehicle 11, here a rotary-wing aircraft. The vehicle 11 is thus also to be considered as an article 4 to be identified.

Indeed, the invention provides such an article 4, in the form of an aircraft that includes at least one device 2 and/or tag 3 as mentioned above.

The structure of such identification devices 2 is described below with reference initially to FIG. 1 or 2. The electronic identification device 2 of the invention operates in the ultra-high frequency (UHF) range in a constraining environment.

In FIG. 1, the electronic device 2 comprises:

a dielectric substrate 12 with a peripheral edge face 13 that defines firstly a transmission face 14 (extending in a plane parallel to the X and Y axes). The peripheral edge face 13 is constituted in this example by four contiguous planes, with edges extending parallel to the Z axis. Furthermore, the peripheral edge face 13 defines a ground face 15 supporting a ground plane 10. The transmission face 14 is the top face in FIG. 1 and it is parallel to the ground face 15, which is the bottom face. The bottom ground face 15 is thus contiguous with the ground plane 10, which is pressed thereagainst.

In FIG. 1, the electronic device 2 includes an electronic chip 16. The electronic chip 16 possesses a user memory "M" in FIG. 1, and presents a complex impedance that is often specified by the formula Rc−jXc (in ohms (Ω)). The electronic chip 16 is attached to the dielectric substrate 12, e.g. by adhesive or by soldering.

A plane and short-circuited curved antenna 9 (PIFA) extends over the transmission face 14 and is electrically connected firstly to the electronic chip 16. A short-circuiting element 17 (or a plurality of such elements as shown in FIG. 7) serves secondly to connect the electronic chip 16 electrically to the electrically-conductive ground plane 10.

This electrical ground plane 10 extends against the ground face 15 of the substrate 12, as described above.

In FIGS. 1 to 3 and 7 to 12, the substrate 12 is made of a synthetic material known as "epoxy". Examples are given below.

It can be seen that the substrate 12 presents a specific thickness, shown specifically in FIG. 1. This thickness 18 designates the distance parallel to the elevation axis Z between the top transmission face 14 and the bottom face 15 (extending in planes of XY orientation).

According to the invention, the substrate 12 presents a thickness 18 of at least 3 millimeters (mm) for its peripheral edge face 13, which thickness is measured perpendicularly to the transmission and ground faces. Along the longitudinal X axis, the substrate 12 of FIG. 1 presents a long dimension "L", whereas along the transverse axis Y, it presents a short dimension "l".

Conventionally, the curved antenna 9 defines on said transmission face 14 at least two strands 19 and 20 of a dipole that are separated from each other by a separator slot 21 that extends substantially from the electronic chip 16 to the proximity of the peripheral edge face 13.

These two strands 19 and 20 define a radiating area for the curved antenna 9. It should be observed that the strand 19 is referred to as the RF signal strand, in contrast to the ground strand 20 (GND).

The short-circuit element 17 extends against the peripheral edge face 13 and presents a short-circuiting area (also referenced 17). If a device 2 possesses a plurality of elements 17, then the short-circuiting area 17 is equal to the sum of the areas of each of its elements 17.

One of the features of the invention, is that for each device 2, the surface area of the set of its short-circuiting elements 17 (in projection on the peripheral edge face 13) is of the order of 3% to 5% of the radiating area of the curved antenna 9.

It is therefore possible to write:

$$3\% \leq [R(17) = S(ACC)S(D19+20)] \leq 5\%$$

where:
  R(17) is the ratio to be calculated, having a value lying in the range 3% to 5%;
  S is the surface area, e.g. measured in square millimeters (mm$^2$);
  ACC is the short-circuiting area, thus S(ACC) is the short-circuiting surface area; and
  "Dipoles 19-20" designate the dipoles 19 and 20 forming the antenna 9, and thus "S(D19+20)" is the surface area of these dipoles.

It can be understood that, when within the range of a reader 5, the device 2 defines a radiating space. Such a space is three-dimensional and is usually represented (using conventional RF simulation tools) by a volume zone defined by the transmission plane 14 in one direction and outwards from said device 2 going away from said plane 14 by a proto-sphere or half-apple shape.

The invention serves to optimize the gain of the device 2, in particular by adjusting the value of the quotient of the surface area of the element 17 divided by the area of the dipoles 19 and 20 that is equal substantially to 3% to 5%.

Surprisingly, and as shown in FIG. 4, this feature imparts to the devices 2 and tags 3 in accordance with the invention, operation that is remarkable, in spite of the constraining environment in which contactless RFID reading/writing is to take place.

In FIG. 4, the graph compares the performance of three devices 2, by varying the surface area of the set of short-circuiting elements 17.

Contactless read/write distance values (in meters: m) are plotted up the ordinate, and values for the area ratio (in percentage: %) are plotted along the abscissa, for each short-circuiting area of the short-circuiting elements 17 of the antenna 9. The curves present Gaussian shapes with respective maximum-range peaks that coincide with the percentage values specific to the invention.

In other words, in accordance with the invention, the short-circuiting elements 17 present a short-circuiting area that is of the order of 3% to 5% of the radiating area (dipoles 19 and 20) of the curved antenna 9.

In practice, an optimum value is frequently found to be close to 4%.

This is observed similarly for embodiments of identification devices 2 in accordance with the invention, regardless of whether they are as shown in FIG. 1 (lines with square marks), in FIG. 2 (line with round marks), or in FIG. 3 (line with triangular marks).

In this example, it is even possible to observe that the electronic devices 2 are such that their short-circuiting elements 17 each present a short-circuiting area of the order of 3.5% to 4.5% of the radiating area of the antenna 9.

In FIGS. 1 to 3 and 14, the short-circuiting elements 17 are in the form of solid outer plates or strips of electrically-conductive material. Each plate is secured to the peripheral edge face 13 by adhesive or the like. This distinguishes these elements from internal conductors known as "vias" that do not enable the specific effects of the invention to be obtained.

In other embodiments, as in FIGS. 7 and 8, each of the elements 17 is formed by applying an electrically-conductive material on the edge face 13, e.g. by printing, spraying, or painting.

Depending on the embodiment, the epoxy substrate 12 presents a thickness for its peripheral edge face that is of the order of 3 mm to 6 mm, e.g. of the order of 3.2 mm or 5.4 mm. In certain applications, greater thicknesses 18 are used, e.g. of the order of 9.6 mm or 12.8 mm.

In FIG. 1, the short-circuiting element 17 is extended against said peripheral edge face 13 at a distance along the transverse axis Y from an outlet zone 22 of one of the two separator slots 21 of the antenna 9.

In this embodiment, the peripheral edge face 13 of the dielectric substrate 12 defines transmission and ground faces that are substantially rectangular. The short-circuiting element 17 extends at a distance from an outlet zone 22 of the separator slot 21 and in a sector (or side) of said edge face 13 that is substantially parallel to the said outlet zone 22.

In FIG. 2, the peripheral edge face 13 defines transmission and ground faces that are likewise substantially rectangular, but of a shape that is more elongate along the X axis, and thus with a transverse side that is relatively shorter along the Y axis.

The short-circuiting element 17 extends at a distance from two outlet zones 22 of the slot 21, which zones are situated in the short sides l of the above-mentioned rectangle. The short-circuiting element 17 is located in a sector of said edge face 13 that is substantially perpendicular to the outlet zones 22 since it extends generally along a longitudinal elevation plane (XZ).

As in FIG. 3, the peripheral edge face 13 of the dielectric substrate 12 is on a corner of said edge face 13.

In FIGS. 7 to 12, the peripheral edge face 13 defines transmission and ground faces that are substantially round-like, e.g. approximately surfaces of revolution as in FIGS. 7 to 8 and 10 to 12, or indeed oval as in FIG. 9.

More precisely, FIGS. 7 and 8 show two embodiments of identification devices 2 having substantially circular outlines, one with a curved antenna 9 forming a labyrinth and the other with an antenna 9 having parallelogram-shaped slots (similar to those referenced as "21").

In FIG. 9, the identification device 2 having a substantially oval outline has an antenna 9 with sector-shaped slots 21. FIGS. 10 to 12 show embodiments of circular identification devices 2 having respectively: in FIG. 10 an antenna 9 with transverse slots (similar to those referenced as "21"); in FIG. 11 an antenna 9 with a sector-shaped slot 21; and in FIG. 12 an antenna 9 with angled slots 21.

It should be observed in FIG. 10 that the device 2 possesses varnish packaging 23 that covers a cap 24 placed over the chip 16 to protect it.

In FIGS. 1 to 3 (but this applies to all of the chips 16 employed in the invention), it can be seen that the electronic chip 16 possesses at least:

a terminal 25 for connection to the first RF signal (RF1) of the electronic chip 16; and a terminal 26 for connection to ground or to a second RF signal (GND/RF2) of the electronic chip 16.

A terminal is said to be a "ground" terminal 26 for a chip 16 presenting an asymmetrical mode, and a terminal 26 is said to be for connection to a second RF signal (RF2) for a chip 16 presenting a symmetrical mode in which a second RF signal (RF2) passes via the terminal 26.

Furthermore, in FIGS. 1 to 3, one of the strands of the dipole 20 of the curved antenna 9 is coupled electrically by the short-circuiting element 17 to the ground plane 10 (GND), while the other strand of the dipole 19 is not coupled in that way. It should be recalled that the dipole strand 20 is the ground strand (GND), while the dipole strand 19 is the RF signal strand (RF) of the antenna 9.

In the embodiment of FIG. 1, the terminal 25 for connection to the first radiofrequency signal (RF1) of the chip 16 is connected to the RF dipole strand 19, which strand is not coupled by the short-circuiting element 17, nor is it coupled to the ground plane 10. It is the connection terminal 26 for connection to ground or to the second RF signal (GND/RF2) of the chip 16 that is electrically connected to the ground dipole strand 20 (GND), i.e. the strand 20 is connected by the element 17 to the ground plane 10. The same applies in FIG. 3.

Conversely, in the embodiment of FIG. 2, it is the connection terminal 26 for connection to ground or to the second RF signal (GND/RF2) of the chip 16 that is connected to the ground dipole strand 19 (GND), itself coupled by the short-circuiting element 17 to the ground plane 10. It can thus be seen that the connection terminal 25 for connection to the first RF signal (RF1) of the chip 16 is electrically connected to the ground dipole strand 20 (GND).

In the embodiments shown, the invention is suitable for devices 2 (and thus tags 3) of small size. It is known that size limits have a direct influence on the possibilities of increasing the radiating area of the antenna 9. If the area (in $mm^2$) of the transmission face is restricted, then the maximum possible dimensions for the dipole strands 19 and 20 of the antenna are correspondingly restricted.

In the examples of FIGS. 1 to 3, the transmission and ground faces 14 and 15 present respective surface areas that are less than 1500 $mm^2$, and in particular that lie in the range 600 $mm^2$ to 1200 $mm^2$. More accurate values are described below in detailed embodiments.

In these embodiments, the dipole strands 19 and 20 of the curved antenna 9 and the transmission face 14 of the substrate 12 present a ratio of their respective surface areas that is of the order of 0.6 to 0.9.

It is thus possible to write:

$$0.6 \le [R(9)=S(D19+D20)/S(14)] \le 0.9$$

where:

R(9) is the ratio to be calculated, having a value of the order of 0.6 to 0.9, e.g. approximately equal to 0.85;

S is the area of a surface, e.g. in $mm^2$;

S(14) is the surface area of the transmission face 14; and

"Dipoles 19-20" designates the dipoles 19 and 20 within the antenna 9, and thus "S(D19+20)" is the surface area of these dipoles.

In FIGS. 1 and 2, the two dipole strands 19 and 20 of the curved antenna 9 are arranged on the transmission face 14 on either side of the electronic chip 16.

In FIG. 1, the strand 19 is on one side of the chip 16, and the strand 20 on the other side, along the longitudinal X axis. It is said that the chip 16 is astride the antenna 9. In FIG. 2, the strand 19 is on one side of the chip 16, the strand 20 on the other, along the transverse axis Y.

In these examples, the electronic chip 16 is at least partially stride relative to an outlet zone 22 of at least one separator slot 21. In FIG. 1 and along the longitudinal axis X, the chip 16 is substantially in register with a separator slot 21, i.e. perpendicular to the transmission face 14. In FIG. 3, the chip 16 is substantially in register with a separator slot 21 along the transverse axis Y.

Embodiments of identification tags 3 are described below.

It can be understood that such a tag 3, once secured to an article 4 for identifying, is intended to mark that article, and that the tag is designed to operate in a constraining environment.

According to the invention, a tag 3 has at least one device 2 as mentioned above together with packaging 23. One of the functions of the packaging 23 is to protect at least the electronic chip 16 from said environment.

Depending on the embodiment, the packaging 23 possesses one or more filler-free materials that are selected whenever possible to be free from any metal filler.

Example materials are specified below. Mention is made in general of materials such as resin and/or silicone and/or epoxy and/or fiber material having a cellulose and/or carbon component (aramid, glass fiber, or the like).

In applications such as that shown in FIG. 13, and for components 4 that are in an environment where temperatures are high, it is appropriate for the device 2 and the tag 3 to present functions that are not degraded by high temperature. This occurs in the proximity of an engine, a gearbox, of electronic components 4 that present resistive heating, or indeed of certain portions of networks for fluids (hydraulic or the like).

Depending on the embodiment, the protective packaging 23 is thus made at least in part out of a high-temperature synthetic material, e.g. a fire-retardant material such as resin and/or silicone and/or epoxy and/or carbon fiber material (aramid, glass fiber, or the like).

In FIG. 1, it can be seen that the packaging 23 includes fastener means 27, i.e. for anchoring the tag 3 on an article 4 to be identified. In this example, a non-masked zone 28 of the base of the substrate 12 receives fastener means 27 in the form of double-sided adhesive 29 for sticking the electronic tag 3 to the article 4 to be identified (here on the area increase region 8).

More generally, the fastener means 27 are secured to the substrate 12 and/or to a portion of the packaging 23.

Still with reference to FIG. 1, the packaging 23 is constituted essentially by a cap 24 fitted on the transmission face 14 of the substrate so as to cover the electronic chip 16 completely and thus protect it.

In this example, the tag 3 has this single cap 24 that is fitted in the form of a filler-free pellet stuck to the transmission face 14 and to certain portions of the dipole strands 19 and 20. In this example, the ground face 14 presents a large non-masked zone 28 that presents no packaging 23 since the packaging is constituted simply by the adhesive 29 that sticks directly to the ground face 15 of the antenna 9 and to the ground plane 10 that receives the face 15.

By way of example, a suitable adhesive 29 is a transfer tape of the type 3M467MP or 468MP, based on high-strength acrylic (see technical bulletin No. 329A536). This adhesive may also be a two-component structural epoxy adhesive, e.g. 3M Scotch-Weld DP460B/A (see technical bulletin No. 06-4616-6).

In FIG. 10, the packaging 23 is formed in part out of varnish, which varnish covers not only the chip 16, but also nearly all of the device 2. More precisely, the chip 16 is covered by a cap 24 similar to that of FIG. 1, and the assembly constituted by said cap 24 and the remainder of the device 2 is covered in varnish.

For example, this varnish has no filler, and it is applied by spraying or dipping in order to protect the cap 24.

An example varnish is obtained by forming a cast mass of polyurethane resin based on a mixture of solvent-free polyols (e.g. SEG U4760) and a polyisocynate hardener based on diphenylmethane diisocyanate (e.g. SEG D72).

In FIG. 11, the cap 24 is fitted in the form of a pellet that is stuck in register with the electronic chip 16, and also with a portion of the transmission face 14.

In some embodiments, the cap 14 is in the form of a box that also covers the peripheral edge face 13 and sometimes possibly also the ground face 15 of the substrate 12, as shown in FIG. 8.

In FIG. 14, the packaging 23 is formed in part on a cover plate 30 that covers at least part of the transmission face 14 of the substrate 12, where the electronic chip 16 can be seen. Here the plate 30 nevertheless does not cover the chip 16 proper.

In this example, the cover plate 30 which is made of a material similar to that of the substrate 12 is applied by filler-free adhesive and possesses a concave housing 31 facing the dielectric substrate 12 in register with the electronic chip 16, along the elevation axis Z. This housing 31 forms a well that opens solely to the outside of said packaging 23 via the cover plate 30, since its bottom end is closed and faces (lies against) the face 14 and the strands 19 and 20.

The housing 31 in the form of a well is closed, within the tag 3, by an applied stopper 32 made of filler-free resin.

This resin may have the same composition as the varnish mentioned above by way of example.

In certain embodiments, at least portions of the packaging 23 are made of other synthetic materials, considered as being filler-free and relatively temperature resistant. Certain embodiments of the packaging 23 include portions of or are constituted by carbon fiber materials such as aramid, glass fiber, or the like. Other embodiments of the packaging 23 include portions or are constituted by silicone materials (e.g. a two-component polyaddition elastomer of the initially-viscous ACC Silicones LTD-MM242 type).

In register with the edge faces 13 and with the ground face 15, the packaging 23 also includes non-masked zones 28 that present no protection. Similarly, in FIG. 1, a zone 28 forms a base opening in register with said ground plane 10. It is in this opening or non-masked zone 28 that the fastener means 27 formed by the adhesive 29 are applied.

This is different from FIG. 14, where the embodiment in accordance with the invention of an electronic tag 3 presents an outline that is likewise substantially of rectangular shape, but with packaging 23 that is formed in part by a cover plate 30 facing the substrate 12.

Additional information for examples similar to those of FIGS. 1 to 3 is given below. Two types of chip 16 are used therein.

A first chip 16 is used in the example of FIG. 1, while the second chip is used in the examples of FIGS. 2 and 3.

The first chip 16 (FIG. 1) is an NXP G2XM model of specifications that are not given in detail herein. It is stated that the impedance of the chip, written Z, is dedicated to 915 megahertz (MHz), from which its impedance at 867 MHz is deduced. The minimum power at which the chip 16 operates is of the order of −15 decibels referenced to one milliwatt (dBm). Its specifications are not given in detail herein. The impedance of this second chip 16 comprises the association of a resistance in ohms (Ω) in parallel with a capacitance (in picofarads (pF)), and the impedance of the second chip 16 is thus at 867 MHz is thus deduced.

With those elements specified, it is appropriate to mention briefly a pre-calculation stage that is of inaccuracy and insufficiency that have made it necessary to develop the specific features of the invention in order to satisfy a specification sheet for a constraining environment.

This pre-calculation step is conventional. For example, pre-modeling is performed using dedicated software. By way of example, it is possible to use the HFSS software from Ansoft.

That comprises software for 3D electromagnetic simulation that takes account of the tag 3 that is to be produced (with the antenna 9 etched on an epoxy type substrate of thickness 18 associated with a chip 16 of defined impedance) in defined packaging 23 (if any) in a desired environment (metal and/or composite surface made of aluminum, steel, iron, aramid, or the like, etc.).

That 3D software uses the finite elements method and takes account of all of the above-mentioned physical characteristics:
the permittivity (∈) and the permeability (μ) of the various materials, and also the loss angle (tan δ) as a function of the operating frequency;
the dimensions and the exact shape of the various elements of the device and of its packaging 23; and
the frequency and the direction of the polarization of the electromagnetic wave.

For the impedance:
The tag 3 that is to be produced is represented diagrammatically as the association of an antenna 9 with a chip 16 such that:
It is said that the antenna 9 matches the chip 16 when ZA=ZP*, since the chip 16 presents impedance of the type ZP=RP−jXP, so for a given frequency an antenna is sought presenting impedance ZA=RA+jXA, i.e. RA+jXA=RP+jXP.

Using the 3D electromagnetic HFSS software, a layout is sought for the antenna 9 that leads to good matching between the chip 16 and the antenna 9. This ensures better performance for the tag 3 that is to be produced, with account being taken of its environment.

Concerning the invention, use is made of two chips 16 available on the market, i.e. presenting two different impedances, and thus two different groups of tags 3 to be produced.

With reference to FIGS. 5 and 6, it should be recalled that the Friis telecommunications equation serves to obtain an order of magnitude for the radio power picked up by a receiver that is situated at a certain distance from a transmitter in free space. This should not be confused with Friis formula which is used to calculate the noise factor of a system.

In this respect, reference may be made to the Wikipedia site.

Great use is made of this equation with RFIDs since it serves to associate the various elements of an RFID system, such as:
the power Pr transmitted by a reader 5;
the power Pt received by a tag 3;
the gain Gr of the reader antenna 5;
the gain Gt of the tag antenna 3;
the distance "d" which is the read distance 33 between the antenna 9 and the reader 5 (see FIG. 1); and
the wavelength λ where: λ=c/(f*√∈r), where "c" is the speed of light, i.e. the propagation "speed" of a disturbance through a medium without movement of material in air, i.e. c=3×10$^8$ meters per second (m/s); "f" is the working frequency, and ∈r is the permittivity of the medium in which the system operates.

Friis equation is then written as follows:

$$\frac{P_r}{P_t} = G_t G_r \left(\frac{\lambda}{4\pi R}\right)^2$$

or indeed: Pr=Pt*Gr*Gt*[λ/4*π*d))^2.

The effective isotropic radiated power (EIRP) can be deduced from this relationship:

$$EIRP=Pt*Gt$$

which is set by the competent authorities in each country. For example, the maximum transmitted power value in Europe is 2W ERP, and in the USA it is 4W EIRP.

As explained, the device 2 and thus the tag 3 is matched when the antenna impedance 9 is equal to the conjugate of the impedance of the chip 16: ZA=ZP*.

In FIGS. 5 and 6, four circles 34 represent the real portions of the impedance. The curves 35 represent the imaginary portion of the impedance.

A zone referenced 36 designates a target impedance zone when designing the antenna 9 in order to achieve matching. A zone 37 designates the impedance zone of the chip 16 selected for the read/write RFID/UHF. The circles 34 and curves 35 are normalized relative to a given impedance value (e.g. 50 ohms), and a zone 38 forms the center of the resulting diagram (obtained from the circles 34 and the curves 35) and corresponds to an impedance Z=(given impedance value) ±j0.

Depending on the way in which the antenna 9 is powered, a different zone is sought after. During pre-calculation of the antenna 9, the profile (design) of the antenna 9 is simulated using the above-mentioned software, with a port fed at 50 ohms. Thus, the impedance of the antenna 9 needs to correspond to the conjugate of the impedance value of the chip 16.

When it appears that the desired antenna 9 has been found, the same design is simulated, but instead of using an impedance of 50 ohms, a port is used that corresponds to the impedance of the chip 16.

I.e., if the antenna 9 has been well selected, then it corresponds to the impedance that is the conjugate of the impedance of the chip 16. Under such circumstances, in order for the antenna 9 to be well matched to the chip 16, it is necessary for the impedance of the device 2 or of the tag 3 to lie in the zone 38 of FIG. 6.

To conclude, there follows a description of the main features of specifications as they apply to embodiments of the invention.

The purpose is to design a device 2 in the UHF range that enables articles 4 to be identified, e.g. aviation type articles. These articles or components may be made of various materials (composite, PVC, aluminum, etc.). It is desired to obtain the greatest read distance "d" 33 between the tag 3 and the antenna of the reader 5 at which the article can be identified. In accordance with the applicable standard, the transmitted power is 2W ERP. The description below begins with the type of antenna 9 that is used, and then continues with a description of its performance.

For this project, the chip 16 has a large memory in order to able to store a large quantity of information. Presently available on the market there are few chips 16 that can satisfy such expectations, and particular available chips are as follows:

Ucode G2XM from NXP. It has a 512-bit user memory and it is fitted in a TSSOP8 package that is easy to solder; and Higgs-3 from Alien. It has a 512-bit user memory and is fitted with an SOT-323 package that is very easy to solder.

The design of the antenna 9 should enable good matching to be achieved between the conjugate of the impedance of the chip 16 and the impedance of the antenna 9. Given that the tag 3 needs to be identifiable when placed on a metallic surface, it needs to have high gain. The difficulty overcome by means of the invention was that of devising a device 2 and a tag 3 that, even when placed on a metallic surface, enable a sufficient amount of waves to be reflected for them to be picked up correctly by the antenna of at least one reader 5.

After performing simulation, the following antennas 9 were tested having a thickness 18 of 3.2 mm and designed to be used for identifying metallic surfaces. With a thickness 18 of 1.6 mm, the device 2 does not operate on metallic surfaces.

During a test stage, other devices 2 were placed on various surfaces. We obtained detection distances of about 0.80 m using a reader 5 that transmits at 2W ERP. By means of the antenna 9 (PIFA), we obtained a small tag 3 that satisfies our specifications. By acting on the various characteristics of the antenna 9 we found a good compromise between the value for the gain of the antenna 9 and the matching of its impedance with that of the chip 16. A good position for the radiating element 17 enables us to identify articles such as articles made of composite material or of metal.

The substrate used was a 35 mm/3.2 mm/35 mm two-layer epoxy. Its presented permittivity lying in the range 4.4 to 4.9.

For example, the substrate was obtained using plates of Duraver®-E-Cu, that are available in thicknesses of 0.8 mm to 3.20 mm, it being understood that the greater thickness is the only thickness used in the embodiments described above.

The material of the substrate 12 was a primary "dysfunctional epoxy" resin with a secondary "multifunctional epoxy" resin. A flame-retardant mechanism was a bromine epoxy resin. An inorganic filler was obtained using a DE 104 KF filler having a glass transition temperature (Tg) lying in the range 110° C. to 150° C.

The tables below give examples of values, successively for the embodiments of FIGS. 1, 2, and then 3.

| Type of chip 16 | NXP - G2XM |
|---|---|
| Composition of radiating element | 128.75 mm$^2$ + 472.13 mm$^2$ |
| Area of radiating element | 601 mm$^2$ |
| Area of strand connecting the radiating element to the ground plane | 26 mm$^2$ |
| Ground area | 701 mm$^2$ |
| Distance measured at 2 W ERP | in air 1 m    on Al 2.80° m |

| Type of chip 16 | Alien - Higgs 3 |
|---|---|
| Composition of radiating element | 389.93 mm$^2$ + 441.78 mm$^2$ |
| Area of radiating element | 832 mm$^2$ |
| Area of strand connecting the radiating element to the ground plane | 33 mm$^2$ |
| Ground area | 1001 mm$^2$ |
| Distance measured at 2 W ERP | in air 1.60° m    on Al 2.40° m |

| Type of chip 16 | Alien - Higgs 3 |
|---|---|
| Composition of radiating element | 38.98 mm$^2$ + 637.905 mm$^2$ |
| Area of radiating element | 677 mm$^2$ |
| Area of strand connecting the radiating element to the ground plane | 82 mm$^2$ |
| Ground area | 901 mm$^2$ |
| Distance measured at 2 W ERP | in air 300 mm    on Al 500 mm |

Nevertheless, the invention is not limited to the embodiments described. On the contrary, it covers any equivalents of the characteristics described.

The invention claimed is:

1. An electronic radiofrequency identification device in the ultra-high frequency (UHF) range, for marking an article that is to be identified in a constraining environment,
    the electronic device comprising at least:
    a dielectric substrate with a peripheral edge face that defines firstly a transmission face and secondly a ground face;
    an electronic chip possessing a user memory (M), having a predetermined impedance, and attached to said dielectric substrate; and
    a plane and short-circuited curved antenna (PIFA) extending over said transmission face and connected firstly to the electronic chip and to a grounding conductor plane via at least one short-circuiting element, which ground plane extends over the ground face of the substrate;
    the electronic identification device being suitable for communicating by RF waves with at least one RF reader having a predefined maximum transmission power in order to form an identification system, wherein said substrate is made of epoxy and presents a thickness of at least 3 mm in its edge face extending perpendicularly to the transmission and ground faces;
    the curved antenna defining, on said transmission face, at least two dipole strands separated from each other by a separator slot extending substantially from the chip to the proximity of the edge face, these two strands defining a radiating area of said antenna;
    said short-circuiting element extending over said edge face and presenting a short-circuiting area in projection on the edge face that is of the order of 3% to 5% of the radiating area of the curved antenna (PIFA);
    wherein the transmission and ground faces present respective areas less than 1500 mm$^2$, in particular lying in the range 600 mm$^2$ to 1200 mm$^2$.

2. An electronic radiofrequency identification device according to claim 1, wherein said short-circuiting element presents a short-circuiting area presenting an area in projection on the edge face that is of the order of 3.5% to 4.5% of the radiating area of the dipole strands of the antenna.

3. An electronic radiofrequency identification device according to claim 1, wherein the epoxy substrate presents a thickness of its peripheral edge face that is of the order of 3 mm to 6 mm.

4. An electronic radiofrequency identification device according to claim 1, wherein said short-circuiting element extends against said peripheral edge face at a distance from at least one outlet zone of said separator slot.

5. An electronic radiofrequency identification device according to claim 4, wherein the peripheral edge face of the dielectric substrate defines transmission and ground faces that are substantially rectangular, said short-circuiting element extending at a distance from an outlet zone of the separator slot and in a sector of said edge face that is substantially parallel to said outlet zone.

6. An electronic radiofrequency identification device according to claim 4, wherein the peripheral edge face of the substrate defines transmission and ground faces that are substantially rectangular, said short-circuiting element extending at a distance from an outlet zone of the slot and in a sector of said edge face that is substantially perpendicular to said zone.

7. An electronic radiofrequency identification device according to claim 4, wherein the peripheral edge face is in the proximity of or indeed is connected to and/or is on a corner of the peripheral edge face of the dielectric substrate.

8. An electronic radiofrequency identification device according to claim 4, wherein the peripheral edge face defines transmission and ground faces that are substantially rounded in shape.

9. An electronic radiofrequency identification device according to claim 1, wherein the electronic chip possesses at least a connection terminal for connection to a first radiofrequency signal (RF1), and a connection terminal for connection to ground or to a second radiofrequency signal (GND/RF2);
a dipole strand of the curved antenna is electrically coupled by the short-circuiting element to the ground plane; and
said connection terminal for the first radiofrequency signal of the electronic chip is connected to the "ground" strand, that is coupled via the short-circuiting element to the ground plane.

10. An electronic radiofrequency identification device according to claim 1, wherein the electronic chip possesses at least a connection terminal for connection to a first radiofrequency signal (RF1), and a connection terminal for connection to ground or to a second radiofrequency signal (GND/RF2);
a dipole strand of the curved antenna is electrically coupled by the short-circuiting element to the ground plane; and
said connection terminal for connection to ground or to the second radiofrequency signal (GND/RF2) of the electronic chip is connected to the "ground" strand that is coupled via the short-circuiting element to the ground plane.

11. An electronic radiofrequency identification device according to claim 1, wherein the dipole strands of the curved antenna, and the transmission face of the substrate presents a ratio of their respective areas of the order of 0.6 to 0.9.

12. An electronic radiofrequency identification device according to claim 1, wherein the two dipole strands of the curved antenna are arranged on the transmission face on either side of the electronic chip.

13. An electronic radiofrequency identification device according to claim 1, wherein said predefined maximum transmission power is of the order of 2 W ERP or 4 W EIRP.

14. An electronic radiofrequency identification tag in the ultra-high frequency (UHF) for marking an article that is to be identified in a constraining environment, wherein the tag comprises at least one device according to claim 1 together with protective packaging covering at least said chip;
the packaging possessing one or more materials free from any metallic filler, such as resin and/or silicone and/or epoxy and/or fiber material having a cellulose component and/or a carbon component (aramid, glass fiber, or the like).

15. An electronic identification tag according to claim 14, wherein said packaging includes means for anchoring the tag on an article to be identified.

16. An electronic identification tag according to claim 14, wherein said packaging is constituted essentially by at least one cap fitted to the transmission face of the substrate in such a manner as to protect the chip.

17. An electronic identification tag according to claim 14, wherein said packaging of the tag is formed at least in part of a varnish that covers at least the chip.

18. An electronic identification tag according to claim 14, wherein said packaging of the tag is formed at least in part from a cover plate that covers at least part of the face of the substrate in which the chip is visible.

19. An electronic identification tag according to claim 14, wherein said protective packaging includes a non-masked zone having no packaging and in the form of a base opening in register with said ground plane.

20. An electronic identification tag according to claim 14, wherein said protective packaging is made at least in part out of high temperature synthetic material.

* * * * *